(12) United States Patent
Tomokage et al.

(10) Patent No.: US 9,035,487 B2
(45) Date of Patent: May 19, 2015

(54) POWER CONTROLLER

(71) Applicant: HONDA MOTOR CO., LTD., Tokyo (JP)

(72) Inventors: Ryoji Tomokage, Wako (JP); Yasuhisa Kume, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 411 days.

(21) Appl. No.: 13/666,974

(22) Filed: Nov. 2, 2012

(65) Prior Publication Data

US 2013/0134775 A1    May 30, 2013

(30) Foreign Application Priority Data

Nov. 30, 2011   (JP) ................. 2011-261246

(51) Int. Cl.
*B60K 1/00* (2006.01)
*B60L 1/00* (2006.01)
*B60L 11/18* (2006.01)
*B60K 1/04* (2006.01)

(52) U.S. Cl.
CPC ............. *B60K 1/00* (2013.01); *B60K 2001/001* (2013.01); *B60K 2001/0438* (2013.01); *B60Y 2400/61* (2013.01); *B60L 1/003* (2013.01); *B60L 11/1816* (2013.01); *B60L 11/185* (2013.01); *B60L 11/1877* (2013.01); *Y02T 10/7005* (2013.01); *Y02T 10/705* (2013.01); *Y02T 90/121* (2013.01); *Y02T 90/14* (2013.01); *Y02T 90/128* (2013.01)

(58) Field of Classification Search
CPC ............. B60I 1/00; H02M 3/335; H02M 1/12
USPC ......... 307/9.1, 66, 58, 82; 439/811, 727, 364; 363/132; 174/16; 317/234
See application file for complete search history.

(56) References Cited

U.S. PATENT DOCUMENTS 7,819,707 B2 * 10/2010 Aoki et al. .................... 439/801

FOREIGN PATENT DOCUMENTS

JP       2007-259596        10/2007

* cited by examiner

*Primary Examiner* — Jared Fureman
*Assistant Examiner* — Rafael Pacheco
(74) *Attorney, Agent, or Firm* — Mori & Ward, LLP

(57) ABSTRACT

A power controller for a vehicle includes a power converter module, a three-phase terminal, and a three-phase terminal base. The three-phase terminal includes a first flat portion, a second flat portion, and a curved portion. The first flat portion is connected to a contact surface of a three-phase output terminal to be in contact with the contact surface. The second flat portion is connected to a fixed surface of the three-phase terminal base to be in contact with the fixed surface. The three-phase terminal has a shape such that a predetermined gap is provided between the first flat portion and the contact surface of the three-phase output terminal when the first flat portion is released from the contact surface of the three-phase output terminal while the second flat portion is being in contact with the fixed surface of the three-phase terminal base.

6 Claims, 10 Drawing Sheets

POWER CONTROLLER

CROSS-REFERENCE TO RELATED APPLICATIONS

The present application claims priority under 35 U.S.C. §119 to Japanese Patent Application No. 2011-261246, filed Nov. 30, 2011, entitled "Power Control Unit." The contents of this application are incorporated herein by reference in their entirety.

BACKGROUND OF THE INVENTION

1. Field of the Invention

The present disclosure relates to a power controller.

2. Discussion of the Background

Japanese Unexamined Patent Application Publication No. 2007-259596 discloses an arrangement in which a connector having three terminals is attached to a wall of a casing accommodating a three-phase inverter and a control circuit and the three terminals are connected to the three-phase inverter through three busbars such that the three terminals output AC power of three phases converted by the three-phase inverter. As disclosed in Japanese Unexamined Patent Application Publication No. 2007-259596, a cooling unit is placed on a bottom surface of the casing and radiating plates are integrated with the wall of the casing such that each radiating plate is separated at a predetermined distance from each of the adjacent terminals of the three terminals and each of the adjacent busbars of the three busbars.

SUMMARY OF THE INVENTION

According to one aspect of the present invention, a power controller for a vehicle includes a power converter module, a three-phase terminal, and a three-phase terminal base. The power converter module is disposed on an upper surface of a fixing member and is configured to convert DC power to three-phase AC power. The power converter module includes a three-phase output terminal to output the three-phase AC power. The three-phase terminal includes a first flat portion, a second flat portion, and a curved portion. The first flat portion is connected to a contact surface of the three-phase output terminal to be in contact with the contact surface. The first flat portion is parallel to the contact surface. The second flat portion is parallel to the first flat portion. The first flat portion is provided closer to a first end of the three-phase terminal than the second flat portion. The second flat portion is provided closer to a second end of the three-phase terminal than the first flat portion. The second end of the three-phase terminal is provided to be connected to an external electric device provided in the vehicle. The curved portion is positioned between the first and second flat portions. The three-phase terminal base is disposed on the upper surface of the fixing member. The three-phase terminal base supports the second flat portion from below. The second flat portion is connected to a fixed surface of the three-phase terminal base to be in contact with the fixed surface. The second flat portion is parallel to the fixed surface. The three-phase terminal has a shape such that a predetermined gap is provided between the first flat portion and the contact surface of the three-phase output terminal when the first flat portion is released from the contact surface of the three-phase output terminal while the second flat portion is being in contact with the fixed surface of the three-phase terminal base.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
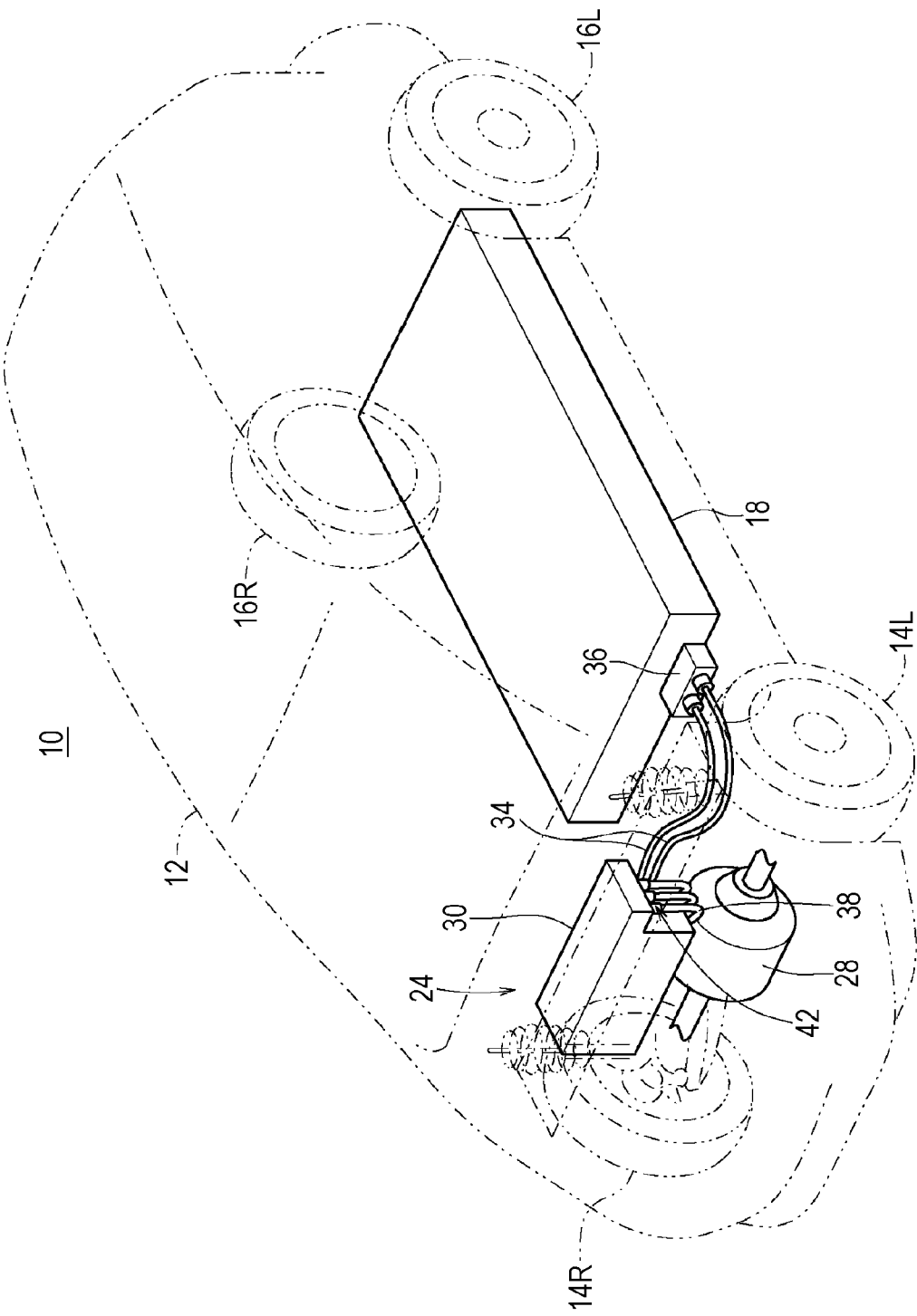
FIG. 1 is a perspective view schematically illustrating the structure of an electric vehicle in accordance with an embodiment.

The embodiments will now be described with reference to the accompanying drawings, wherein like reference numerals designate corresponding or identical elements throughout the various drawings.

Figure 2:
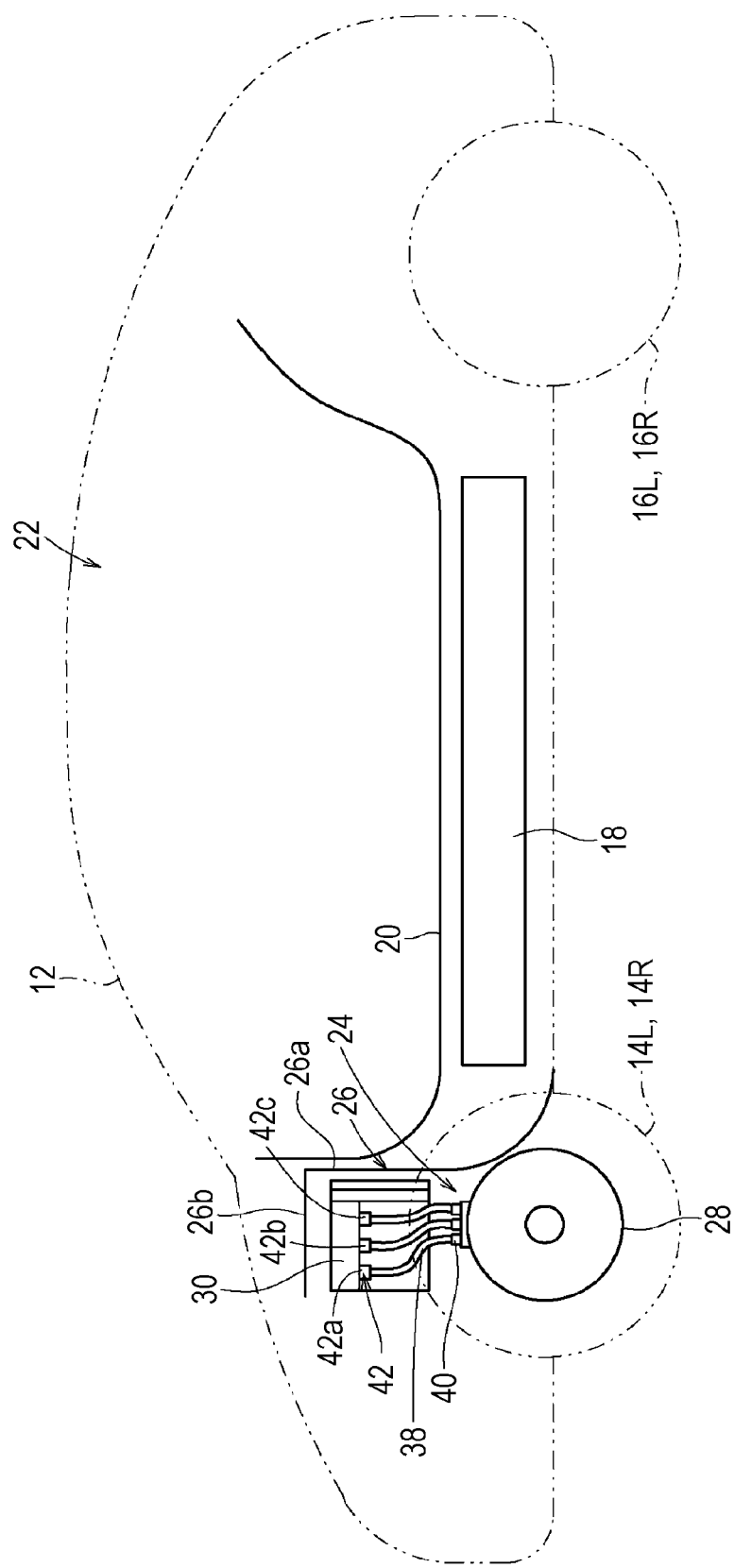
FIG. 2 is a side view schematically illustrating the structure of the electric vehicle in accordance with the embodiment.

FIG. 1 is a perspective view schematically illustrating the structure of an electric vehicle (vehicle) 10. FIG. 2 is a side view schematically illustrating the structure of the electric vehicle 10. In this embodiment, a direction along the height of a vehicle body 12 will be referred to as a "vertical direction" and a direction perpendicular to the vertical direction will be referred to as a "horizontal direction". Furthermore, a forward moving direction of the electric vehicle 10 will be referred to as "front", a backward moving direction of the electric vehicle 10 will be referred to as "back", the leftward direction relative to the forward moving direction will be referred to as "left", and the rightward direction relative to the forward moving direction will be referred to as "right".

The electric vehicle 10 includes, inside the vehicle body 12, a battery 18, a vehicle interior 22, a motor room 24, a dashboard 26, and a power control unit 30. The battery 18 that outputs high voltage is placed on the bottom of the vehicle body 12 such that the battery 18 is positioned between front wheels 14L and 14R and rear wheels 16L and 16R. The vehicle interior 22 is positioned above the battery 18, with a floor panel 20 therebetween. The motor room 24 is separated from the vehicle interior 22 and is located in the front of the vehicle body 12. The dashboard 26 covers the motor room 24. The power control unit 30 is placed under the dashboard 26 so as to be positioned above a drive motor (external electric device) 28, serving as a kind of rotating electric machine, accommodated in the motor room 24. The dashboard 26 includes a dashboard lower part 26a and a dashboard upper part 26b. The dashboard 26 separates the motor room 24 from the vehicle interior 22 and is configured to prevent the entry of, for example, dirt, water, and smell from the motor room 24. The dashboard 26 has a water discharging function for preventing water, entered from the outside, from flowing into an air conditioner (A/C) pipe.

Power supply cables 34 that transmit power stored in the battery 18 to the power control unit 30 are connected at one end to a power supply connector 36, and the other end to a power supply connector 94 (refer to FIG. 7) of the power control unit 30. The power control unit 30 converts DC power supplied from the battery 18 to AC power of three phases (U, V, and W phases) and supplies the three-phase AC power to the drive motor 28 to drive the drive motor 28 in a controlled manner.

Figure 4:
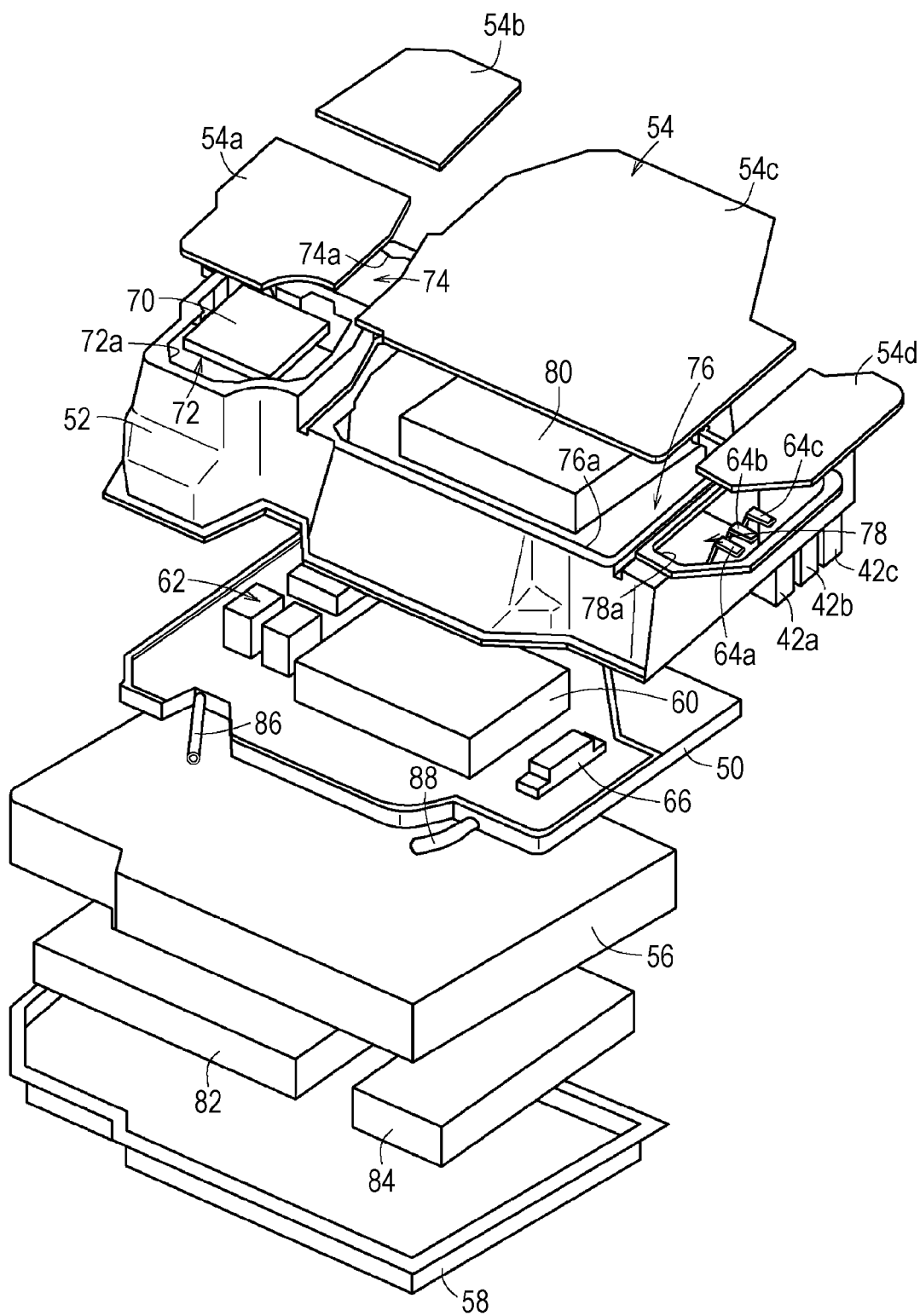
FIG. 4 is an exploded perspective view of the power control unit of FIG. 3.
Figure 7:
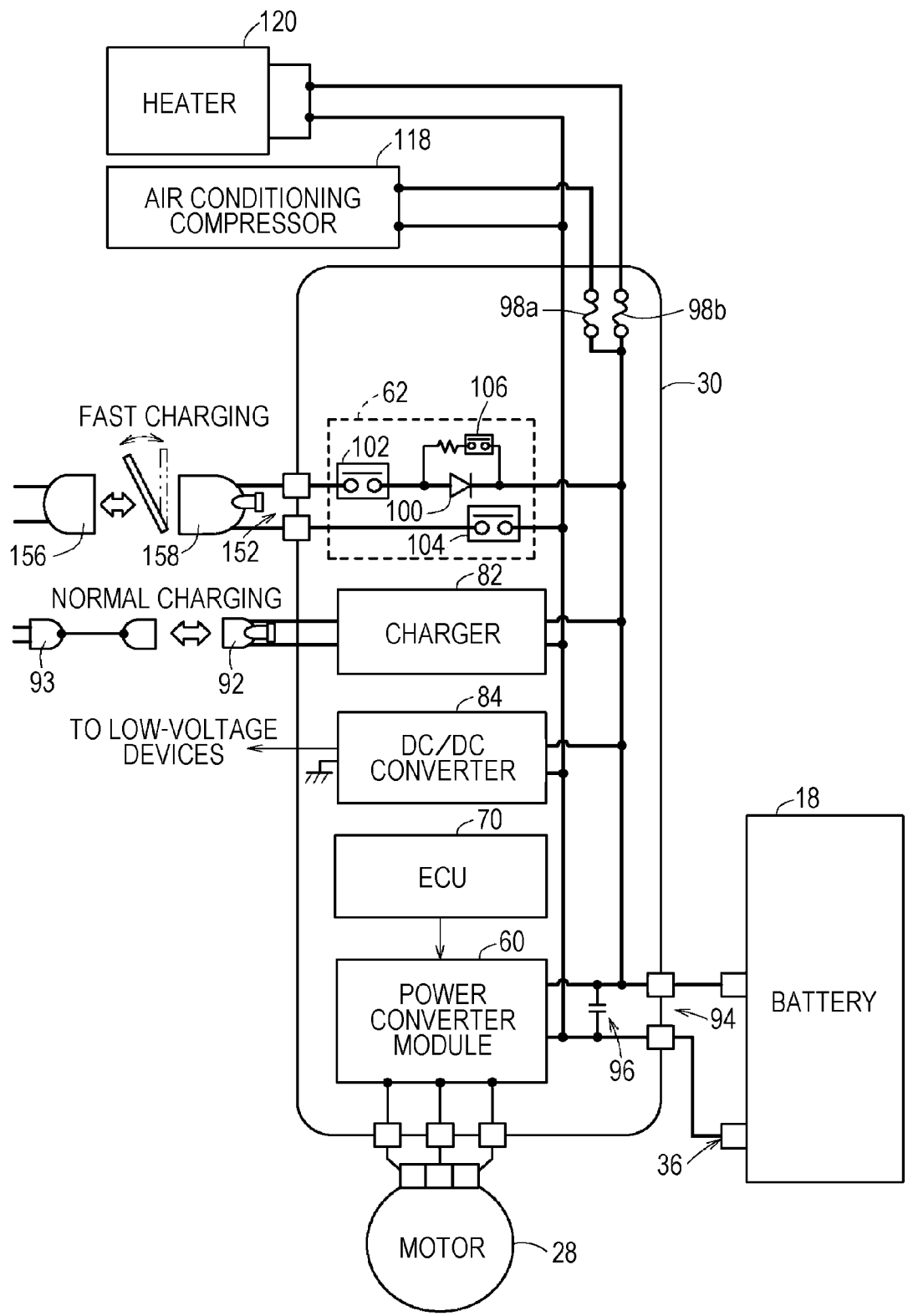
FIG. 7 is a circuit diagram of the power control unit.

The power control unit 30 includes a power converter module 60 (refer to FIGS. 4, 5, and 7) and an engine control unit, or electronic control unit (ECU) 70 (refer to FIGS. 4 and 7). The power converter module 60 converts DC power to three-phase AC power. The ECU 70 controls the power converter module 60 to drive the drive motor 28. The drive motor 28 and the power control unit 30 are connected through three-phase AC power cables (power supply lines) 38. The three-phase AC power cables 38 are connected at one end to a power connector 40 of the drive motor 28, and the other end to power connectors 42 (power connectors 42a, 42b, and 42c) of the power control unit 30. Since the power control unit 30 is positioned above the drive motor 28, the three-phase AC power cables 38 for high voltage may be short.

Figure 3:
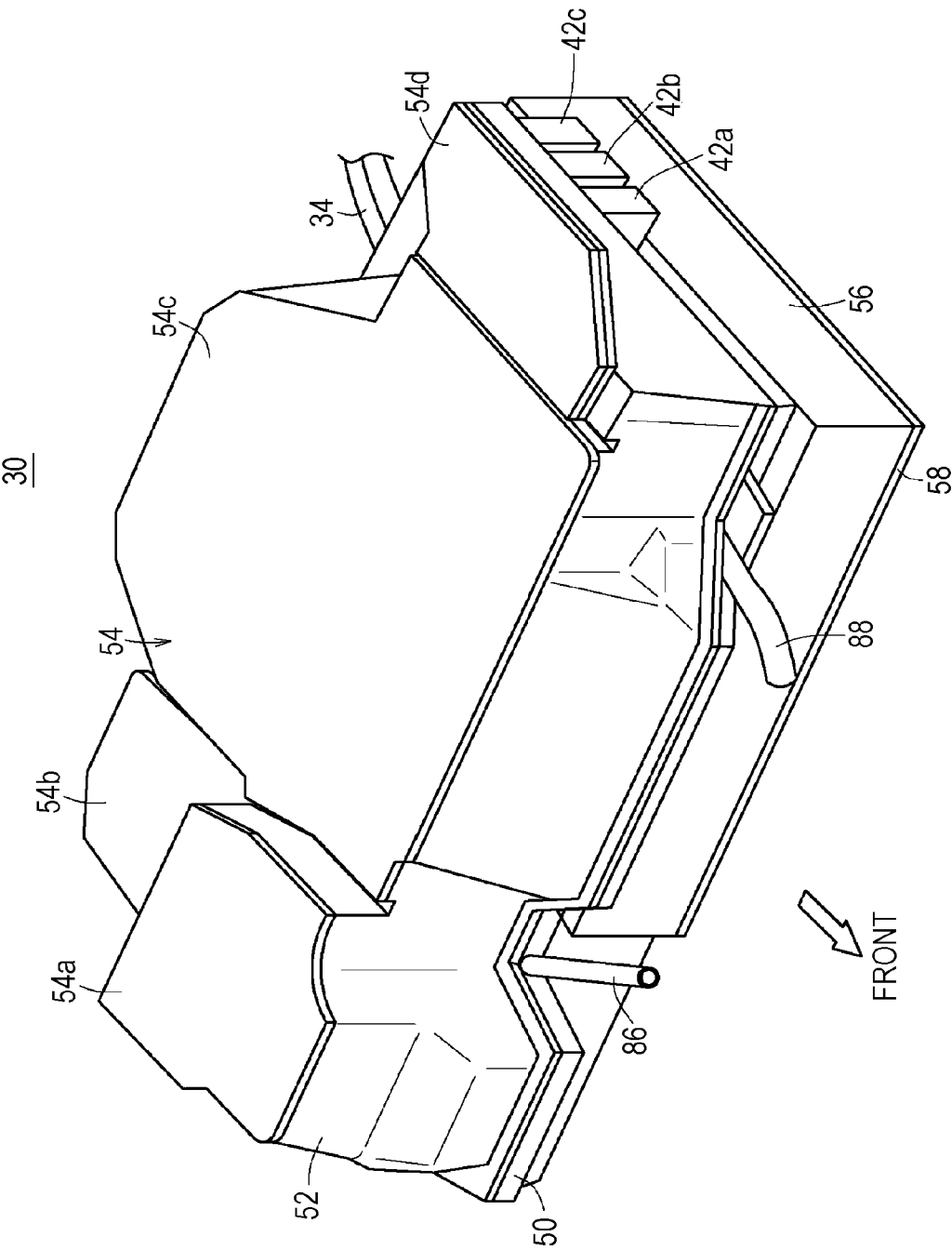
FIG. 3 is a perspective view of the appearance of a power control unit illustrated in FIG. 1.

FIG. 3 is a perspective view of the appearance of the power control unit 30. FIG. 4 is an exploded perspective view of the power control unit 30. The power control unit 30 includes a heat sink 50, an upper case 52 placed on the heat sink 50, an upper cover 54 covering the top of the upper case 52, a lower case 56 placed under the heat sink 50, and a lower cover 58 covering the bottom of the lower case 56. The heat sink 50, the upper case 52, the upper cover 54, the lower case 56, and the lower cover 58 constitute a housing of the power control unit 30.

The power converter module 60 is placed at substantially the center of an upper surface of the heat sink 50. A fast charging device (charging device) 62 used to externally charge the battery 18 and fuses 98a and 98b (refer to FIGS. 5 and 7) are arranged on the right of the upper surface of the heat sink 50. Three-phase terminals 64a, 64b, and 64c (hereinafter, also referred to collectively as "three-phase terminals 64") connecting the power converter module 60 to the power connectors 42a, 42b, and 42c on the upper case 52 are arranged above the left of the heat sink 50. The power converter module 60 converts DC power supplied from the battery 18 to AC power of three phases (U, V, and W phases) and outputs the AC power of three phases to the three-phase terminals 64a, 64b, and 64c. The three-phase terminals 64a, 64b, and 64c are supported from below at substantially the middle by a three-phase terminal base 66 disposed on the left of the upper surface of the heat sink 50. The three-phase terminal base 66 includes a heat conductive member to transmit heat from the three-phase terminals 64a, 64b, and 64c to the heat sink 50.

The power converter module 60 includes a switching module including a plurality of switching elements in the housing. Turning on or off the switching elements allows the power converter module 60 to convert DC power from the battery 18 to three-phase AC power, alternatively, to convert three-phase AC power from the drive motor 28 to DC power.

Figure 8:
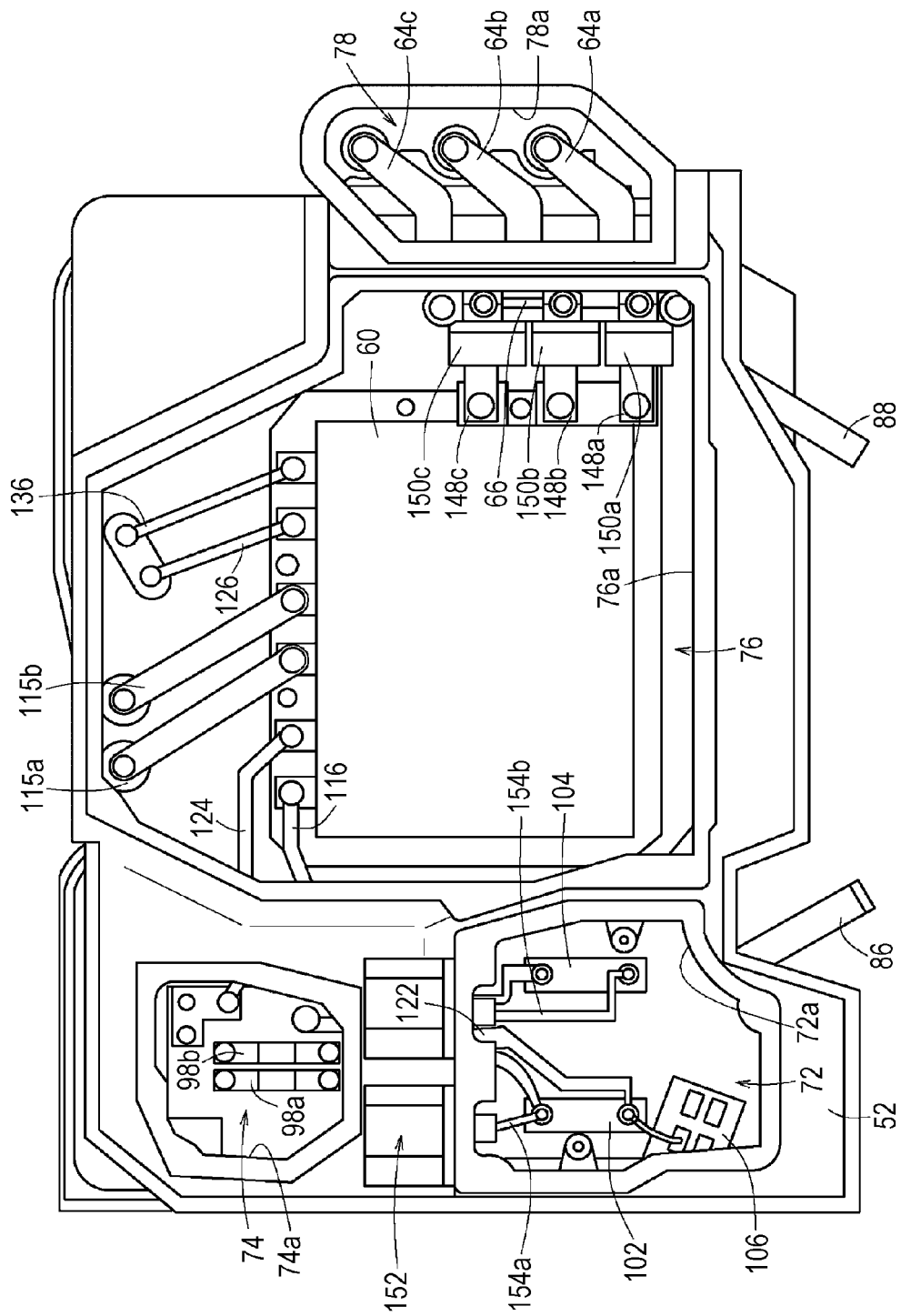
FIG. 8 is a top plan view of the heat sink of FIG. 5 covered with an upper case.

The heat sink 50 and the upper case 52 define a charging device chamber 72 that accommodates the fast charging device 62, a fuse chamber 74 that accommodates the fuses 98a and 98b, a power conversion chamber 76 that accommodates the power converter module 60, and a three-phase terminal chamber 78 that accommodates the three-phase terminals 64a, 64b, and 64c. Referring to FIGS. 4 and 8, the charging device chamber 72 has a first opening (charging-device-chamber opening) 72a positioned in an upper surface of the upper case 52, the first opening 72a allowing access to the inside of the charging device chamber 72. The fuse chamber 74 has a second opening (fuse-chamber opening) 74a positioned in the upper surface of the upper case 52, the second opening 74a allowing access to the inside of the fuse chamber 74. The power conversion chamber 76 has a third opening (power-conversion-chamber opening) 76a positioned in the upper surface of the upper case 52, the third opening 76a allowing access to the inside of the power conversion chamber 76. The three-phase terminal chamber 78 has a fourth opening (three-phase-terminal-chamber opening) 78a positioned in the upper surface of the upper case 52, the fourth opening 78a allowing access to the inside of the three-phase terminal chamber 78. The ECU 70 controlling the power converter module 60 is disposed above the fast charging device 62 and is positioned in the charging device chamber 72.

The upper cover 54 includes a first segment 54a which covers the first opening 72a, a second segment 54b which covers the second opening 74a, a third segment 54c which covers the third opening 76a, and a fourth segment 54d which covers the fourth opening 78a. Since the charging device chamber 72 is higher than the fuse chamber 74, the power conversion chamber 76, and the three-phase terminal chamber 78, the first opening 72a is positioned at a level higher than levels where the second, third, and fourth openings 74a, 76a, and 78a are arranged.

A capacitor module 80 including a smoothing capacitor 96 (refer to FIG. 7) is attached so as to be hung on an inner wall of the upper case 52 such that the capacitor module 80 is positioned above the power converter module 60 and below the third opening 76a. The smoothing capacitor 96 is electrically connected to the power converter module 60 and is configured to smooth power from the battery 18. The capacitor module 80 includes a housing that accommodates the smoothing capacitor 96.

A charger 82 and a DC/DC converter 84 are arranged on a bottom surface of the lower case 56. The charger 82 charges the battery 18. The DC/DC converter 84 lowers a voltage across the battery 18 to supply low-voltage power to low-voltage devices (electrical components) mounted in the electric vehicle 10. Each of the DC/DC converter 84 and the charger 82 is accommodated in a rectangular housing. The housing of the charger 82, which tends to be large because the number of parts of the charger 82 is greater than that of the DC/DC converter 84, is larger than the housing of the DC/DC converter 84.

The heat sink 50 includes an inlet 86 into which a fluid flows and an outlet 88 from which the fluid flows. A bottom surface of the heat sink 50 and an upper surface of the lower case 56 define a flow path (not illustrated) through which the fluid flows. The fluid, which has flowed into the inlet 86, passes through the flow path defined by the heat sink 50 and the lower case 56 and flows from the outlet 88. Consequently, the heat sink 50 can dissipate heat generated from the power converter module 60 and the fast charging device 62 arranged on the upper surface of the heat sink 50 and heat generated from the charger 82 and the DC/DC converter 84 arranged under the bottom surface of the heat sink 50 to cool these components.

Figure 5:
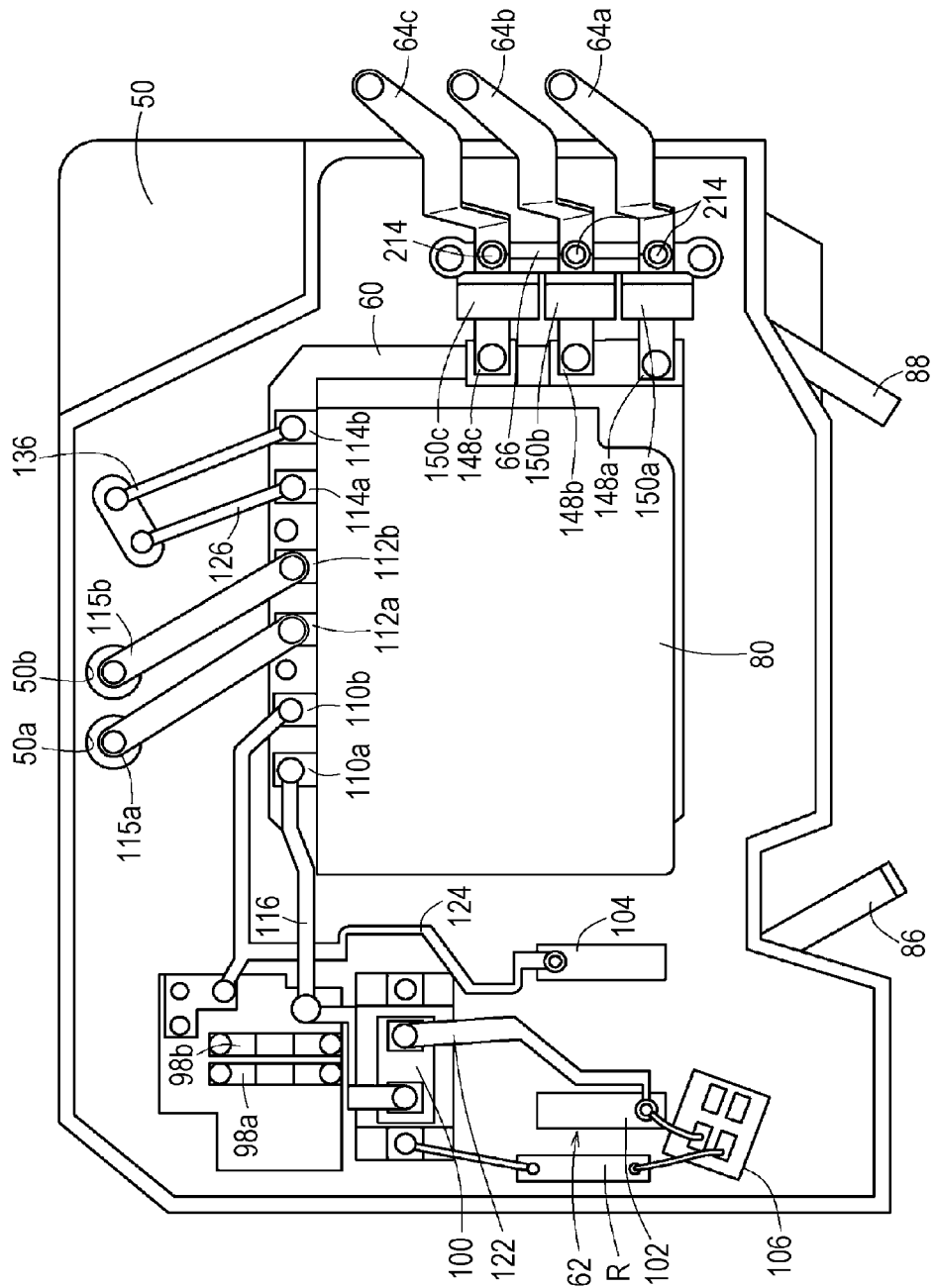
FIG. 5 is a top plan view of a heat sink illustrated in FIG. 4.
Figure 6:
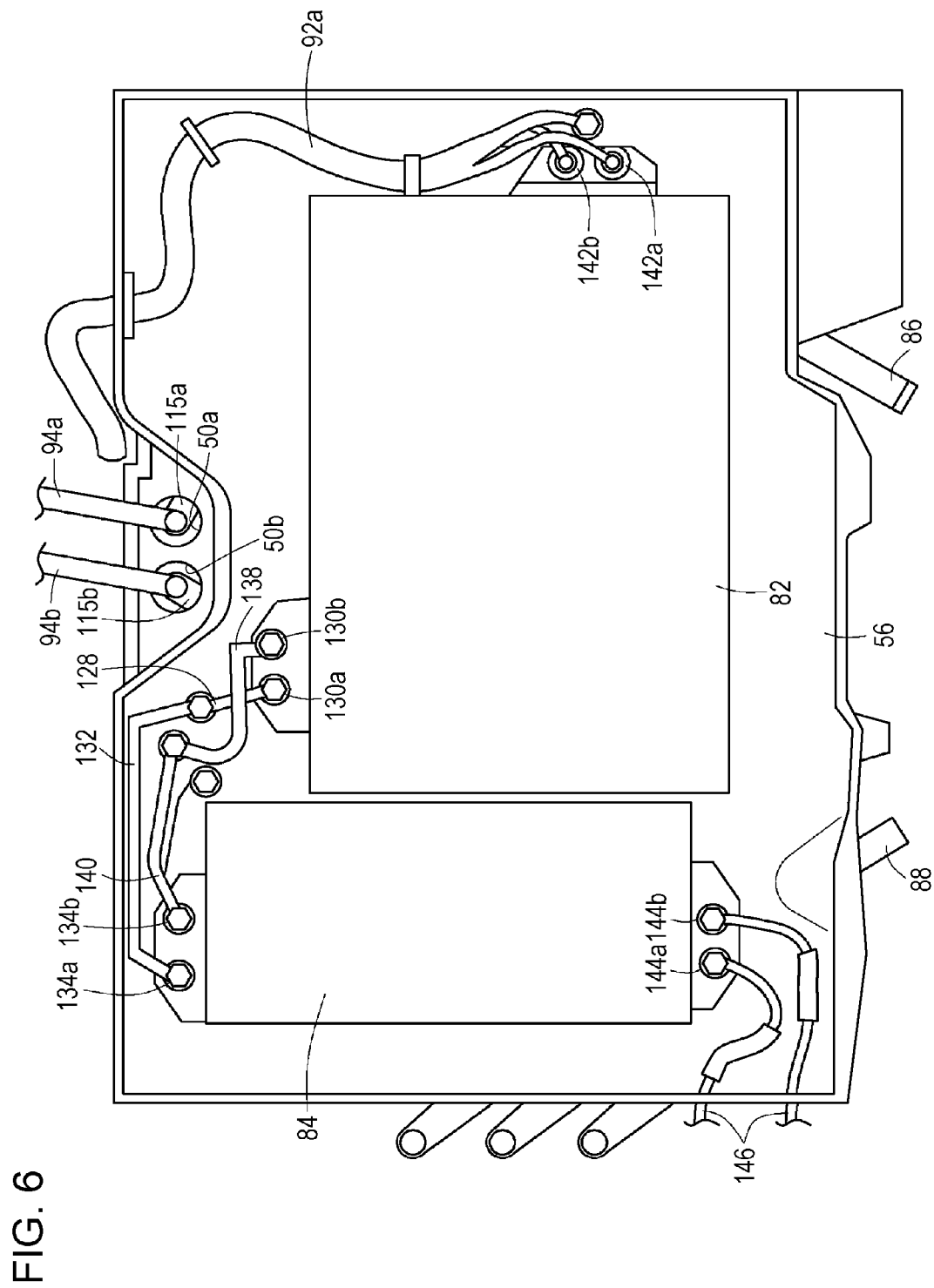
FIG. 6 is a bottom plan view of a lower case illustrated in FIG. 4.

FIG. 5 is a top plan view of the heat sink 50. FIG. 6 is a bottom plan view of the lower case 56. FIG. 7 is a circuit diagram of the power control unit 30.

The power converter module 60 is connected to the power supply connector 94 (refer to FIG. 7) and the battery 18 is connected to the power supply connector 94 through the power supply cables 34, so that the power converter module 60 is connected to the battery 18. The smoothing capacitor 96 of the capacitor module 80 is connected in parallel to the power converter module 60 and the battery 18 such that the smoothing capacitor 96 for smoothing a voltage is positioned between the power converter module 60 and the battery 18. The capacitor module 80 is electrically connected to the DC/DC converter 84, the charger 82, the fast charging device 62, and the fuses 98a and 98b with busbars.

The DC/DC converter 84, the charger 82, the fast charging device 62, and the fuses 98a and 98b are accordingly connected to the battery 18. Each busbar is formed by punching a metal plate, such as a copper plate. The fast charging device 62 includes a diode (fast charging diode) 100, a first main contactor (first fast-charging contactor) 102, a second main contactor (second fast-charging contactor) 104, a resistor R, and a precontactor 106. Since such high-voltage components, i.e., the power converter module 60, the DC/DC converter 84, the charger 82, and the fast charging device 62 are accommodated in the single housing as described above, these components can be connected with the busbars without using high-voltage cables. Thus, the power control unit 30 can be miniaturized and the cost can be reduced.

Referring to FIG. 5, the capacitor module 80 includes a first positive terminal 110a, a first negative terminal 110b, a second positive terminal 112a, a second negative terminal 112b, a third positive terminal 114a, and a third negative terminal 114b. The first positive terminal 110a, the second positive terminal 112a, and the third positive terminal 114a are in electrical continuity with each other. The first negative terminal 110b, the second negative terminal 112b, and the third negative terminal 114b are in electrical continuity with each other. The second positive terminal 112a and the second negative terminal 112b are connected to the power supply connector 94 through busbars 115a ad 115b and power supply cables 94a ad 94b (refer to FIG. 6). Thus, the second positive terminal 112a is connected to a positive electrode of the battery 18 and the second negative terminal 112b is connected to a negative electrode thereof.

The power converter module 60 includes a positive connection terminal and a negative connection terminal (connection terminals), which are not illustrated, connected to the second positive terminal 112a and the second negative terminal 112b, respectively. The positive connection terminal of the power converter module 60 is connected to the second positive terminal 112a and one end of the busbar 115a. The negative connection terminal of the power converter module 60 is connected to the second negative terminal 112b and one end of the busbar 115b. The power supply cables 94a and 94b extend from below the heat sink 50 into the power control unit 30 through through-holes 50a and 50b, respectively, and are connected to the other ends of the busbars 115a and 115b, respectively.

The fuses 98a and 98b are connected at one end to the first positive terminal 110a and the cathode of the diode 100 by one busbar 116. The busbar 116 and the battery 18 are at the same potential. The other end of the fuse 98a which is not connected to the first positive terminal 110a is connected to an air conditioning compressor (compressor for air conditioning) 118. The other end of the fuse 98b which is not connected to the first positive terminal 110a is connected to a heater 120 (refer to FIG. 7).

The cathode of the diode 100 is connected via the resister R and the precontactor 106 to one end of the first main contactor 102. The anode of the diode 100 is connected to the one end of the first main contactor 102 by a busbar 122. The first negative terminal 110b is connected to one end of the second main contactor 104 by a busbar 124.

Referring to FIGS. 5 and 6, the third positive terminal 114a is connected to a fourth positive terminal 130a of the charger 82 by busbars 126 and 128 and is further connected to a fifth positive terminal 134a of the DC/DC converter 84 by the busbar 126 and a busbar 132. The third negative terminal 114b is connected to a fourth negative terminal 130b of the charger 82 by busbars 136 and 138 and is further connected to a fifth negative terminal 134b of the DC/DC converter 84 by the busbar 136 and a busbar 140.

A sixth positive terminal 142a and a sixth negative terminal 142b of the charger 82 are connected to a connector 92 through a cable 92a. A seventh positive terminal 144a and a seventh negative terminal 144b of the DC/DC converter 84 are connected to cables 146 leading out of the power control unit 30. Accordingly, power with voltage lowered by the DC/DC converter 84 can be supplied through the cables 146 to the low-voltage devices mounted in the electric vehicle 10.

Referring to FIG. 5, the power converter module 60 further includes a U-phase terminal 148a, a V-phase terminal 148b, and a W-phase terminal 148c (hereinafter, also referred to collectively as "three-phase output terminals 148"). The U-phase terminal 148a is connected to the three-phase terminal 64a, the V-phase terminal 148b is connected to the three-phase terminal 64b, and the W-phase terminal 148c is connected to the three-phase terminal 64c.

Referring to FIG. 6, the DC/DC converter 84 and the charger 82 are arranged such that the longitudinal direction of the DC/DC converter 84 is orthogonal to that of the charger 82 and one long side of the DC/DC converter 84 is next to one short side of the charger 82.

A plug 93 connected to the connector 92 is connected to a commercial receptacle, so that an AC power of 100 V or 200 V is supplied to the charger 82. The charger 82 normally charges the battery 18 (refer to FIG. 7).

Referring to FIG. 5, current sensors 150a, 150b, and 150c detect currents flowing into the three-phase terminals 64a, 64b, and 64c, respectively. The current sensors 150a to 150c will also be referred to collectively as the "current sensors 150" hereinafter.

FIG. 8 is a top plan view of the heat sink 50 of FIG. 5 covered with the upper case 52. In FIG. 8, the capacitor module 80 is not illustrated. The upper case 52 is provided with a fast charging connector 152. The other end of the first main contactor 102 and the other end of the second main contactor 104 are connected to the fast charging connector 152 through busbars 154a and 154b, respectively. Referring to FIG. 7, the fast charging connector 152 is connected to a connector 158 to be connected to a charger-side connector 156 of a fast charger (not illustrated) for supplying high-voltage DC power, the fast charger being placed at a charging station in, for example, a service area (rest area). Connecting the charger-side connector 156 of the fast charger to the connector 158 allows the charger to fast charge the battery 18.

Figure 9:
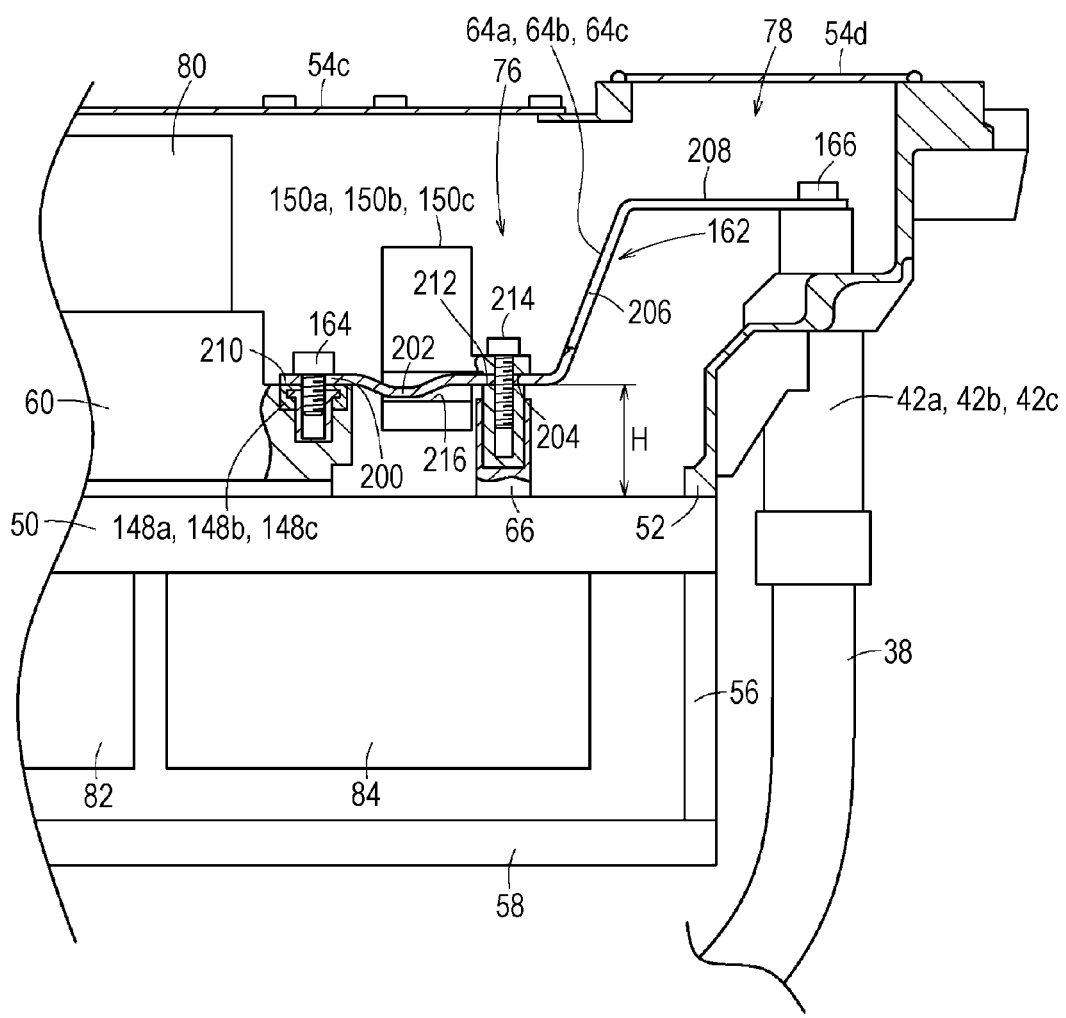
FIG. 9 is a partial sectional view of the power control unit.
Figure 10:
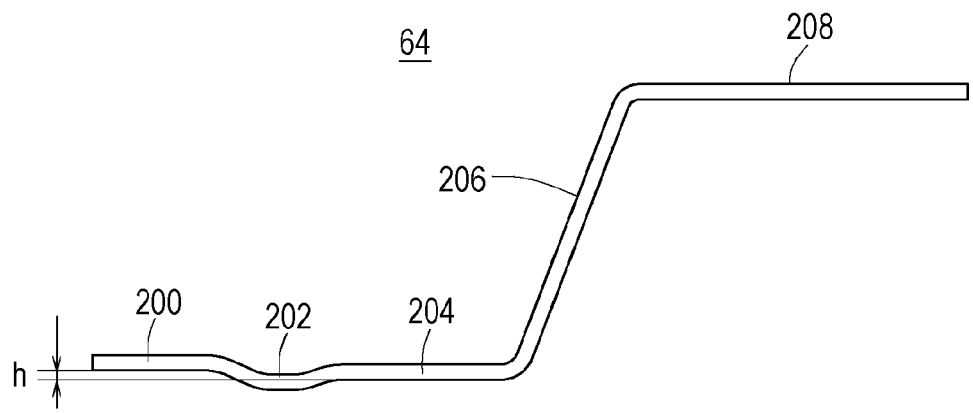
FIG. 10 is a side view of a three-phase terminal illustrated in FIG. 9.

FIG. 9 is a partially sectional view of the power control unit 30. FIG. 10 is a side view of the three-phase terminal 64 illustrated in FIG. 9. Referring to FIG. 9, the power conversion chamber 76 communicates with the three-phase terminal chamber 78 through a communicating hole 162. The three-phase terminals 64a, 64b, and 64c are connected at one end to the U-phase terminal 148a, the V-phase terminal 148b, and the W-phase terminal 148c by bolts (fastening members) 164, respectively. The three-phase terminals 64a, 64b, and 64c are positioned at the other end in the three-phase terminal chamber 78 so as to extend through the communicating hole 162. The three-phase terminals 64a, 64b, and 64c are connected at the other end to the power connectors 42a, 42b, and 42c by bolts (fastening members) 166, respectively. Consequently, the U-phase terminal 148a, the V-phase terminal 148b, and the W-phase terminal 148c of the power converter module 60 are connected to the power connectors 42a, 42b, and 42c, respectively.

The points of connection between the power connectors 42a, 42b, and 42c and the other ends of the three-phase terminals 64a, 64b, and 64c are arranged at a level higher than the U-phase terminal 148a, the V-phase terminal 148b, and the W-phase terminal 148c. The three-phase terminals 64a, 64b, and 64c are accordingly shaped such that each three-phase terminal is bent upwardly at a distance from the one end thereof and then horizontally extends to the other end thereof.

More specifically, each three-phase terminal 64 (64a, 64b, 64c) includes a first flat portion 200, a curved portion 202, a second flat portion 204, an inclined portion 206, and a contact terminal 208 as illustrated in FIG. 10. The first flat portion 200 is closer to the one end of the three-phase terminal 64 and extends horizontally from the one end thereof to the other end thereof. The curved portion 202 extending continuously from the first flat portion 200 to the other end of the three-phase terminal 64 is bent downwardly (toward the heat sink 50) and is then bent upwardly. The second flat portion 204 is closer to the other end of the three-phase terminal 64 and horizontally extends continuously from the curved portion 202 to the other end thereof at a level lower than the first flat portion 200 by a distance h. The inclined portion 206 extends continuously from the second flat portion 204 upwardly to the other end of the three-phase terminal 64. The contact terminal 208 horizontally extends continuously from the inclined portion 206 to the other end of the three-phase terminal 64 and is used for connection to the drive motor 28.

The first flat portion 200 of each three-phase terminal 64 is in contact with and fixed to a contact surface 210 of the corresponding three-phase output terminal 148 (the U-phase terminal 148a, the V-phase terminal 148b, or the W-phase terminal 148c) with the bolt 164 such that the first flat portion 200 and the contact surface 210 are parallel to each other. Additionally, the second flat portion 204 of the three-phase terminal 64 is in contact with and fixed to a fixed surface 212, serving as an upper surface of the three-phase terminal base 66, by a bolt 214 such that the second flat portion 204 and the fixed surface 212 are parallel to each other. The contact surface 210 and the fixed surface 212 are parallel to each other.

The current sensors 150a, 150b, and 150c are attached to the three-phase terminal base 66 via the three-phase terminals 64a, 64b, and 64c by the respective bolts 214. The three-phase terminals 64a, 64b, and 64c extend through the current sensors 150a, 150b, and 150c, respectively. More specifically, the current sensors 150a, 150b, and 150c each have a through-hole 216. The three-phase terminals 64a, 64b, and 64c extend through the through-holes 216 of the current sensors 150a, 150b, and 150c.

Furthermore, the power converter module 60 is molded such that the contact surface 210 of each three-phase output terminal 148 disposed in the heat sink 50 is positioned at the same level as that of the fixed surface 212 of the three-phase terminal base 66 disposed in the heat sink 50. Although errors caused in a manufacturing process may cause a tolerance which allows the contact surface 210 of each three-phase output terminal 148 to be higher or lower than the fixed surface 212 of the three-phase terminal base 66, the errors are deemed to be non-existent in this embodiment. The contact surface 210 of each three-phase output terminal 148 and the fixed surface 212 of the three-phase terminal base 66 are arranged at a level H.

The second flat portion 204 is lower than the first flat portion 200 by the distance h. Assuming that the three-phase terminal base 66 is not provided for the heat sink 50, when the first flat portions 200 are fixed to the three-phase output terminals 148 (the U-phase terminal 148a, the V-phase terminal 148b, and the W-phase terminal 148c) by the bolts 164 and the contact terminals 208 are fixed to the power connectors 42a, 42b, and 42c by the bolts 166, the level of the second flat portions 204 is lower than the level H, where the fixed surface 212 of the three-phase terminal base 66 is positioned, by the distance h. Conversely, when the second flat portions 204 are fastened to the fixed surface 212 of the three-phase terminal base 66 by the bolts 214, the first flat portions 200 are higher than the three-phase output terminals 148 by the distance h.

Since the three-phase terminals 64 have such a shape, the second flat portions 204 press the fixed surface 212 of the three-phase terminal base 66 when the first flat portions 200 are fixed to the three-phase output terminals 148 by the bolts 164, the second flat portions 204 are fixed to the three-phase terminal base 66 by the bolts 214, and the contact terminals 208 are fixed to the power connectors 42a, 42b, and 42c, so that the three-phase terminals 64 are in tight contact with the three-phase terminal base 66. Accordingly, heat from the three-phase terminals 64 is efficiently dissipated by the heat sink 50 through the three-phase terminal base 66. Thus, the performance of heat dissipation of the three-phase terminals 64 is improved.

If errors in the process of manufacturing the power converter module 60 cause a tolerance in level of the contact surface 210 of each three-phase output terminal 148 such that the contact surface 210 of the three-phase output terminal 148 is higher than the fixed surface 212 of the three-phase terminal base 66, the corresponding three-phase terminal 64 is in tight contact with the three-phase terminal base 66 by making the distance h between the first flat portion 200 and the second flat portion 204 longer than the tolerance. Thus, the heat dissipation performance of the three-phase terminal 64 can be improved. In order to further improve the heat dissipation performance of the three-phase terminal 64, a thermal compound may be disposed between the three-phase terminal base 66 and the upper surface of the heat sink 50.

Figure 11:
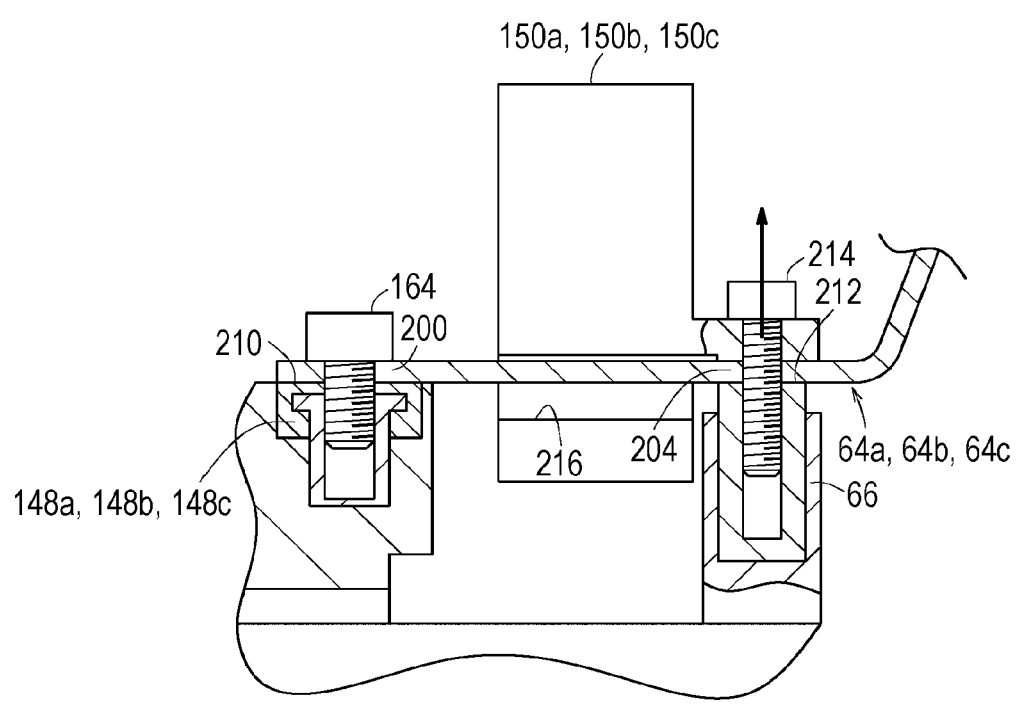
FIG. 11 is a partial sectional side view of the power control unit in which a first flat portion and a second flat portion of the three-phase terminal are at the same level for comparison with the partial sectional view of FIG. 9.

Assuming that the first flat portion 200 of each three-phase terminal 64 and the second flat portion 204 thereof are arranged at the same level (the first flat portion 200 and the second flat portion 204 are arranged at the same plane) as illustrated in FIG. 11, if a tolerance is caused in level of the contact surface 210 of each three-phase output terminal 148 such that the contact surface 210 of the three-phase output terminal 148 is higher than the fixed surface 212 of the three-phase terminal base 66, the bolt 214 will be pulled upward (indicated by an arrow in FIG. 11) by the second flat portion 204 of the three-phase terminal 64, so that the second flat portion 204 may be separated from the fixed surface 212 of the three-phase terminal base 66. Disadvantageously, the degree of contact between the second flat portion 204 and the three-phase terminal base 66 may be reduced and the heat dissipation performance of the three-phase terminal 64 may be lowered. Note that the three-phase terminal 64 of FIG. 11 has no curved portion 202.

As described above, each three-phase terminal 64 is shaped such that the first flat portion 200 is higher than the second flat portion 204 by the distance h. Accordingly, when the first flat portion 200 is fixed to the three-phase output terminal 148 by the bolt 164 and the second flat portion 204 is fixed to the three-phase terminal base 66 by the bolt 214, the second flat portion 204 presses the fixed surface 212 of the three-phase terminal base 66. Thus, the degree of contact between the three-phase terminal 64 and the three-phase terminal base 66 is increased. Consequently, heat from the three-phase terminal 64 is efficiently dissipated by the heat sink 50 through the three-phase terminal base 66, thus improving the heat dissipation performance of the three-phase terminal 64.

In addition, since the current sensors 150 are attached to the three-phase terminal base 66, it is unnecessary to arrange brackets for attaching the current sensors 150. Advantageously, the current sensors 150 can be attached at low cost. Since the heat dissipation performance of each three-phase terminal 64 is high, the current sensors 150 do not tend to be susceptible to heat from the three-phase terminals 64 while being attached to the three-phase terminal base 66. Advantageously, a reduction in the detection accuracy of the current sensors 150 can be prevented and the current sensors 150 can also be prevented from being damaged.

In the above-described embodiment, each curved portion 202 is bent downwardly and is then bent upwardly. The curved portion 202 may be bent upwardly and be then bent downwardly. Alternatively, a portion between the first flat portion 200 and the second flat portion 204 may be inclined from the first flat portion 200 to the second flat portion 204.

While the exemplary embodiment has been described, it will be understood that the scope of the present disclosure should not be limited to the scope described in the aforementioned embodiment. It will be apparent to those skilled in the art that various alterations and modifications can be made to the embodiment described herein. Obviously, such alterations and modifications may be within the scope of the present disclosure, as set forth in the appended claims.

A power control unit according to the embodiment is installed in a vehicle, and includes a power converter module disposed on an upper surface of a fixing member, the power converter module converting direct current (DC) power to three-phase AC power, a three-phase terminal including a first flat portion, a second flat portion which is parallel to the first flat portion, and a curved portion positioned between the first and second flat portions, and a three-phase terminal base disposed on the upper surface of the fixing member, the three-phase terminal base supporting the second flat portion from below. The power converter module includes a three-phase output terminal that outputs three-phase AC power. The first flat portion closer to one end of the three-phase terminal is in contact with and fixed to a contact surface of the three-phase output terminal such that the terminals are parallel to each other. The second flat portion closer to the other end of the three-phase terminal is in contact with and fixed to a fixed surface of the three-phase terminal base such that the second flat portion is parallel to the fixed surface. The other end of the three-phase terminal serves as a connection terminal for connection to an external electric device. The three-phase terminal is shaped such that a predetermined gap is formed between the first flat portion and the contact surface of the three-phase output terminal when the first flat portion is released from the contact surface of the three-phase output terminal while the second flat portion is being in contact with and fixed to the fixed surface of the three-phase terminal base.

Accordingly, the three-phase terminal of the embodiment can press the fixed surface of the three-phase terminal base disposed on the fixing member, thus increasing the degree of contact between the three-phase terminal and the three-phase terminal base. If the fixing member includes a heat sink, heat from the three-phase terminal is therefore dissipated efficiently by the heat sink through the three-phase terminal base. The performance of heat dissipation of the three-phase terminal is increased.

The three-phase terminal base of the embodiment may be provided with a current sensor that detects current flowing through the three-phase terminal. The three-phase terminal may extend through the current sensor. Accordingly, a bracket for attachment of the current sensor is not needed. The current sensor can be attached at a low cost. Since the performance of heat dissipation of the three-phase terminal is high, the current sensor will not tend to be susceptible to heat from the three-phase terminal if the current sensor is attached to the three-phase terminal base. Thus, a reduction in the accuracy of detection of the current sensor can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A power controller for a vehicle, comprising:
    a power converter module disposed on an upper surface of a fixing member and configured to convert DC power to three-phase AC power, the power converter module including a three-phase output terminal to output the three-phase AC power;
    a three-phase terminal comprising:
        a first flat portion connected to a contact surface of the three-phase output terminal to be in contact with the contact surface, the first flat portion being parallel to the contact surface;
        a second flat portion parallel to the first flat portion, the first flat portion being provided closer to a first end of the three-phase terminal than the second flat portion, the second flat portion being provided closer to a second end of the three-phase terminal than the first flat portion, the second end of the three-phase terminal being provided to be connected to an external electric device provided in the vehicle; and
        a curved portion positioned between the first and second flat portions; and
    a three-phase terminal base disposed on the upper surface of the fixing member, the three-phase terminal base supporting the second flat portion from below, the second flat portion being connected to a fixed surface of the three-phase terminal base to be in contact with the fixed surface, the second flat portion being parallel to the fixed surface, the three-phase terminal having a shape such that a predetermined gap is provided between the first flat portion and the contact surface of the three-phase output terminal when the first flat portion is released from the contact surface of the three-phase output terminal while the second flat portion is being in contact with the fixed surface of the three-phase terminal base.

2. The power controller according to claim 1, wherein the fixing member comprises a heat sink.

3. The power controller according to claim 1,
    wherein the three-phase terminal base includes a current sensor configured to detect current flowing through the three-phase terminal, and
    wherein the three-phase terminal extends through the current sensor.

4. The power controller according to claim 3,
    wherein the current sensor includes a through-hole, and
    wherein the three-phase terminal extends through the through-hole of the current sensor.

5. The power controller according to claim 4, wherein the curved portion of the three-phase terminal is provide in the through-hole of the current sensor.

6. The power controller according to claim 1, wherein the curved portion is closer to the upper surface of the fixing member than the first flat portion and the second flat portion.

* * * * *